United States Patent [19]

Simpson

[11] 4,089,833

[45] May 16, 1978

[54] PROCESS AIDS FOR FLUOROSILICONE POLYMERS

[75] Inventor: Verne G. Simpson, Clifton Park, N.Y.

[73] Assignee: General Electric Company, Waterford, N.Y.

[21] Appl. No.: 793,226

[22] Filed: May 2, 1977

[51] Int. Cl.² .................... C08K 5/54; C08G 77/00; C08G 77/04

[52] U.S. Cl. .................... 260/29.15 B; 260/37 SB; 260/46.5 R; 260/46.5 G; 526/279

[58] Field of Search .............. 260/29.1 SB, 46.5 R, 260/46.5 G, 37 SB

[56] References Cited

U.S. PATENT DOCUMENTS

| | | | |
|---|---|---|---|
| 2,890,188 | 6/1959 | Konkle et al. | 260/37 SB |
| 2,927,908 | 3/1960 | Konkle et al. | 260/29.1 SB |
| 2,954,357 | 9/1960 | Fekete | 260/37 SB |
| 3,006,878 | 10/1961 | Talcott | 260/29.1 SB |
| 3,202,542 | 8/1965 | Poje | 260/29.1 SB |
| 3,464,945 | 9/1969 | Martellock | 260/37 SB |
| 3,804,801 | 4/1974 | Day et al. | 260/29.1 SB |
| 3,900,617 | 8/1975 | Grenoble | 260/46.5 G |
| 3,925,276 | 12/1975 | Merrill | 260/46.5 G |
| 3,937,684 | 2/1976 | Razzano | 260/46.5 R |
| 3,974,120 | 8/1976 | Razzano et al. | 260/30.4 SB |
| 3,986,993 | 10/1976 | Vassiliou | 260/29.1 SB |
| 3,997,496 | 12/1976 | Razzano | 260/46.5 G |
| 4,018,734 | 4/1977 | Dumoulin | 260/29.1 SB |

*Primary Examiner*—Herbert J. Lilling
*Attorney, Agent, or Firm*—E. Philip Koltos; John L. Koltos; Frank L. Neuhauser

[57] ABSTRACT

A process aid for fluorosilicone compositions and polymers to prevent such polymers in the uncured state from sticking or partitioning on processing equipment comprising adding to the fluorosilicone polymer composition from 2 to 25% by weight of a non-halogenated process aid which is a diorganopolysiloxane polymer having a viscosity varying from 100,000 to 10,000,000 centipoise at 25° C. The organo groups in such a polymer are selected from alkyl radicals, vinyl radicals, phenyl radicals and mixtures thereof wherein the vinyl concentration varies from 5 to 25% by weight. In the alternative that may be utlizied at the same concentration a non-halogenated process aid which is a polysiloxane composed of $R_2SiO$ units and $R\ SiO_{3/2}$ units wherein the polyme has a viscosity in the range of 5 and 10,000 centipose at 25° C and its silanol content varying from .1 to 5% by weight and R is a monovalent hydrocarbon radical.

35 Claims, No Drawings

PROCESS AIDS FOR FLUOROSILICONE POLYMERS

BACKGROUND OF THE INVENTION

The present invention relates to process aids and more specifically the present invention relates to process aids for fluorosilicone polymers. Fluorosilicone compositions are well known at this time. Briefly, such polymers are obtained for heat vulcanizable silicone rubber compositions by equilibrating cyclic trimers containing trifluoropropyl substituent groups in the presence of an alkali metal hydroxide to result in, at the appropriate end point the formation of high molecular weight, fluorosilicone substituted gums or polymers having a viscosity anywhere from 500,000 centipoise to 200,000,000 centipoise at 25° C. These polymers are then taken and they are processed in various metal equipment by adding to them fillers, compression set additives, heat agent additives, and flame retardants. Finally, the composition is cured by the incorporation of a peroxide in the composition and heating the resulting composition after it has been formed to the desired form at elevated temperatures to form a silicone elastomer. Such heating is usually in the order of 100° C to 250° C from a one to three hour period of time. The composition and hours of forming of such polymers is more fully described for instance in U.S. Pat. Nos. 2,979,519, 3,179,619 and 3,002,951. The preparation of such polymers is also to be found in U.S. Pat. Nos. 3,997,496, 3,937,684 and 3,974,120 which disclose alternate processes for producing these fluorosilicone polymers. In addition, in a recent innovation there have been prepared fluorosilicone substituted polymers in SiH olefin platinum catalyzed composition. The preparation of the fluorosilicone substituted polymers and utilization thereof to produce SiH olefin platinum catalyzed compositions is for instance to be found in Jeram U.S. Ser. No. 619,592. Briefly, such SiH olefin platinum catalyzed compositions comprise a vinyl terminated polysiloxane polymer having trifluoropropyl substituent groups in combination with an extending or reinforcing filler or both, a hydride silane or siloxane and a platinum catalyst. In such compositions normally the vinyl siloxane base polymer is kept separate from the hydrosiloxane and the platinum catalyst is packaged with one or the other components with the filler being usually mixed into the vinyl containing polysiloxane. When it is desired to cure the composition, the two components are normally mixed and allowed to cure at room temperature over a period of time of 24 hours or longer or may be permitted to cure at elevated temperatures in a matter of seconds or minutes. Such elevated temperatures are in the order of above 100° C. In any case, when such fluorosilicone polymers and specifically polymers having a viscosity in excess of 100,000 centipoise and more usually having a viscosity in the range of 500,000 centipoise to 200,000,000 centipoise at 25° C are utilized. Such polymers when processed in the usual equipment so as to incorporate into them fillers and other ingredients by milling or mixing such polymers tend to stick with great tenacity to metal surfaces and even glass surfaces, thus, making the processing of such polymers very difficult. In addition to such stickiness, such fluoro substituted polymers and gums or compositions have a great tendency, due to their stickiness, to shear on mills when they are processed to mix the desired ingredients in them.

Accordingly, to facilitate the processing of such fluorosilicone substituted polymers and gums it is highly desirable to incorporate in them from say 1% to 10% by weight of the total composition of a process aid so as to improve the processability. An example and a disclosure of such process aids for fluorosilicone polymers is for instance to be found in Talcott U.S. Pat. No. 3,006,878. As pointed out in that patent Talcott appeared to solve the problem of processing fluorosilicone polymers by incorporating into fluorosilicone substituted polymers and gums two process aids, in combination. The first process aid was perfluoro-alkyl substituted organo silicone compound containing at least 0.25% by weight silicon bonded hydroxyl groups and the second process aid is an organic compound inert to the fluorosilicone polymer and is a benzene soluable organo silicone compound, said compound component having a boiling point above 100° C. This combination of process aids solved to some extent the processing problems of fluorosilicone polymers. However, it was not an advantageous method of resolving the stickiness problem. One reason for this was that it was expensive to produce a fluorosilicone substituted polymer process aid as is desired for the first process aid defined in the Talcott Patent. In addition, this patent required not a simple addition of one process aid, but the Talcott Patent required the addition of two process aids in which even the second process aid was indicated to have a fluoro substituent groups. Accordingly, it was highly desirable to find a simple and inexpensive process aid for fluorosilicone polymers. Accordingly, it is one object of the present invention to utilize an inexpensive process aid for fluorosilicone polymers.

It is another object of the present invention to provide a non-halogenated process aid which can simply be added to the fluorosilicone polymers to decrease their stickitiveness to processing equipment to an acceptable degree.

It is still another object of the present invention to provide for a simple and economical process aid to decrease the stickitiveness of fluorosilicone polymers to processing equipment.

It is yet an additional object of the present invention to provide for a non-halogentated process aid for fluorosilicone polymers and fluorosilicone gums, that is polymers having a viscosity of at least 100,000 centipoise and more preferably for polymers and gums having a viscosity in the range of 500,000 to 200,000,000 centipoise at 25° C. These and other objects of the present invention are accomplished by means of the disclosure set forth herein below.

SUMMARY OF THE INVENTION

In accordance with the objects, there is provided by the present invention a fluorosilicone composition that has superior resistance to sticking to processing equipment comprising, a diorganopolysiloxane base polymer having a viscosity of at least 100,000 centipoise or more preferably in the range of 500,000 to 200,000,00 centipoise at 25° C where the organo groups of such polymer are selected from monovalent hydrocarbon radicals and more preferably selected from the class consisting of alkyl radicals of 1 to 8 carbon atoms, vinyl radicals, phenyl radicals and 3,3,3 trifluoropropyl radicals and mixtures thereof, wherein the concentration of the trifluoropropyl radical varies from 5 to 50 mole percent and there is incorporated such base diorganopolysiloxane base polymer preferably at the range of 2 to 25% by weight and more preferably to a range of 2 to 10% by weight of a non-halogenated process aid which is a diorganopolysiloxane polymer having a viscosity varying from 100,000 to 10,000,000 centipoise at 25° C where the organo groups are selected from alkyl radicals, vinyl radicals, phenyl radicals and mixtures thereof and wherein the vinyl concentration varies from 5 to 25 weight percent of the polymer. Preferably, the process aid is utilized at a concentration of 2 to 10% by weight since it is desirable that the fluorosilicone portion of the fluorosilicone polymer not be diluted too much. If the base polymer is diluted too much then the solvent resistant properties of the cured elastomer are undesirably decreased. Broadly, the two important criterion of the process aid described above, is its viscosity and its vinyl concentration.

If the above process aid does not have a vinyl concentration in the range of 5 to 25 weight percent then its advantages for enhancing the non-stickitiveness of the fluorosilicone polymers and compositions is undesirably decreased. It has been found that the process aid must have a vinyl concentration of at least 5% by weight to function effectively as a process aid. A concentration of above 25% by weight of vinyl in the process aid does not measurably enhance the performance of the process aid in reducing the stickitiveness of the base polymer. In addition, even though process aids outside the foregoing viscosity range of 100,000 to 10,000,000 centipoise which have the desired vinyl concentration can be utilized as a process aid for fluorosilicone compositions, no advantages are gained thereby and specifically as the viscosity of the process aid drops much below 100,000 centipoise, its ability to reduce the stickitiveness of a fluorosilicone polymer is decreased. On the other hand, if the viscosity of the vinyl containing process aid exceeds much above 10,000,000 centipoise no added benefits will be gained by the increased viscosity. The process aid preferably has the vinyl substituent units on the internal silicone atoms in the polymer chain. However, vinyl on the terminal units as well as on the internal portion of the polymer chain can be tolerated. It is desired there by at least some vinyl on chain substituent groups in the preferred process aid in the instant invention.

Accordingly, in addition to the foregoing process aid there can be utilized extending and reinforcing fillers, heat agent additives, flame retardant additives and peroxide curing catalyst to cure the composition. As an alternative to the foregoing vinyl containing process aid described, there may be utilized another non-halogenated process aid. However, the foregoing vinyl containing process aid described is the preferred process aid in the instant invention. The less preferred process aid comprises incorporating in the base fluorosilicone polymer or composition from 2 to 25% by weight of the base fluorosilicone polymer, a second process aid which is a non-halogenated polysiloxane composed of $R_2SiO$ units and $R\ SiO_{3/2}$ units having a viscosity in the range of 5 to 10,000 centipoise at 25° and a silanol content varying from 0.1 to 5% by weight where the R substituting group is selected from the class consisting of alkyl radicals of 1 to 3 carbon atoms, phenyl and vinyl radicals and mixtures thereof. The necessary properties of such a non-halogenated process aid appears to be its content of trifunctional siloxy units which may vary anywhere from 4 to 15% by weight or preferably varies at a concentration of 5 to 10% by weight. When it is not known the reason why such trifunctionality in the polymer enhances its ability to impart to the fluorosilicone polymer the desired non-stickitiveness to processing equipment it has been found nevertheless that such is accomplished. It should be noted that if the content of the trifunctional siloxy units is less than 4% by weight, the desired decrease of stickitiveness is not obtained and if it is more than 15% by weight no added advantage is obtained thereby. Even though this alternative process aid may be utilized to reduce the stickitiveness of fluorosilicone polymers nevertheless, the first process aid described above is the one more preferred for utilization in the instant case. It should be noted that neither of these process aids need be used together to obtain the desired advantages mentioned previously. In this respect, the first vinyl containing process aid discussed above functions very effectively in reducing the stickitiveness of fluorosilicone polymers.

DESCRIPTION OF THE PREFERRED EMBODIMENT

The base polymer that is utilized with which the process aid of the instant invention is utilized is a diorganopolysiloxane polymer of a viscosity of at least 100,000 centipoise at 25° and more preferably a viscosity in the range of 500,000 to 200,000,000 centipoise at 25° C. The organo groups of such a polymer are selected from monovalent hydrocarbon radicals and halogenated monovalent hydrocarbon radicals. In such a polymer from 5 to 50 mole percent of the hydrocarbon substituent units are halogenated monovalent hydrocarbon radicals and more particularly perfluoroalkyl substituent groups such as 3,3,3 trifluoropropyl radicals. Other radicals or organo groups in such diorganopolysiloxane may be selected from any monovalent hydrocarbon radical such as alkyl radicals of 1 to 8 carbon atoms, such as methyl, ethyl, propyl, cycloalkyl radicals such as cyclohexyl, cycloheptyl; mono-nuclear aryl radicals such as phenyl, methylphenyl, ethylphenyl, propylphenyl, etc.; alkenyl radicals such as vinyl, allyl, etc. and other well known substituent units for such diorganopolysiloxane polymers. Most preferably, the substituent units for such diorganopolysiloxane polymer are selected from the class consisting of alkyl radicals from 1 to 3 carbon atoms, such as vinyl radicals, phenyl radicals and 3,3,3 trifluoropropyl radicals and mixtures thereof wherein the concentration of the trifluoropropyl radicals that must be present in the polymer varies from 5 to 50 mole percent and more preferably from 5 to 45 mole percent. In additive such diorganopolysiloxane base polymer may have a vinyl concentration varying from 0.01 to 4 mole percent, and more preferably from 0.01 to 2 mole percent. Such vinyl concentration is preferred even when the diorganopolysiloxane polymer is to be utilized in a heat vulcanizable silicone rubber composition since the vinyl radicals allow the polymer to cross-link properly when catalyzed with the peroxide catalyst at elevated temperatures to form a heat vulcanizable silicone elastomer. Such diorganopolysiloxane bas polymer may preferably have the formula of $R'SiO_{(4-a)/2}$ where the value of a varies from 1.98 to 2.01 and where R' can be any of the organo groups as defined above in the broader description of the diorganopolysiloxane base polymer. It is noted that the vinyl groups for heat vulcanizable silicon rubber compositions in such diorganopolysiloxane base polymers may be at any part of the polymer chain, but are preferably terminal siloxy units. Vinyl groups can also be present and appended through a silicone atom to the internal portion of the siloxane polymer chain. Such fluorinated substituted diorganopolysiloxane base polymers may be produced by the procedure set forth in the references cited previously. Briefly, such polymerization process comprises preparing the cyclic trimer by hydrolyzing fluorinated substituted dichlorosilanes and then taking the hydrolyzate and cracking it with KOH or another alkali metal hydroxide and preferentially distilling and collecting the foregoing fluorinated substituted cyclic trimer from the hydrolyzate. The trimer is then taken and is catalyzed by the small amount of alkali metal hydroxide or other more esoteric alkali metal catalysts and heated at elevated temperatures, that is temperatures above 100° C, to obtain the equilibration of the cyclic trimer into a high molecular weight fluorinated substituted polysiloxane polymer, that is the Base polymer of the instant case. It should be noted that in such equilibration procedure of the cyclic trimer converts almost 100% to the linear diorganopolysiloxane base polymer of the instant case. Further, there can be utilized the appropriate amount of chain stoppers such as hexamethyldisiloxane, divinyltetramethyltrisiloxane, octamethyltrisiloxane and other chainstoppers to obtain at equilibration the proper molecular weight diorganopolysiloxane base polymer of the instant invention. After the equilibration procedure step is terminated, then there is simply added to the mixture a sufficient amount of neutralizing acid to neutralize the catalyst and any cyclics remaining are vented off to result in the linear diorganopolysiloxane base polymer of the instant case. Another procedure that may be utilized as disclosed in the foregoing Razzano Patents is the preparation of fluorinated substituted cyclic tetramers from the hydrolysis of the fluorinated substituted dichlorosilanes and then taken the hydrolyzate as before and cracking it with an alkali metal catalyst to preferentially distill overhead the fluorinated substituted cyclic tetramers. Such fluorinated substituted cyclic tetramers are then taken and equilibrated in the presence of specific catalysts such as cesium hydroxides and potassium silanolates, at temperatures in the range of 90 to 120° C with the appropriate amount of chain stopper to obtain at equilibration a high molecular weight fluorinated substituted base polymer having a viscosity of at least 100,000 centipoise and more preferably in the range of 500,000 to 200,000,000 centipoise at 25° C. As it was noted previously, either by having alkenyl substituting group such as vinyl on the polymer chain or by the use of vinyl substituted chain stoppers, there can be incorporated vinyl in the polymers such that they have a vinyl content of anywhere from 0.01 to 4 mole percent and preferably from 0.01 to 2 mole percent. After the equilibration procedure is terminated, the equilibration point being reached where as much of the cyclic tetramers are being formed into the base polymer as there is of the base polymer breaking up to form a cyclic tetramer, the reaction mixture is cooled, the catalyst is neutralized with an acid, such for instance as acetic acid and the unreacted cyclics and other volatiles are vented off to result in the desired base diorganopolysiloxane polymer. For heat vulcanizable silicone rubber compositions, such a polymer is mixed with a reinforcing or extending filler. Examples of reinforcing fillers are fumed silica and precipitated silica. Examples of extending fillers are for instance metal oxides such as titanium, zinc oxide, barium oxide and the like and insulative materials such as clay, diatomaceous earth and crushed quartz. Preferably the fillers can be treated with cyclic polysiloxane to prevent the uncured composition from structuring upon standing prior to cure of the composition. Generally, such fillers are utilized at concentrations of anywhere from 5 to 200 parts by weight based on a 100 parts of the base diorganopolysiloxane fluorinated substituted polymer. The precise amount of filler employed will vary with the type of filler and the properties desired in the final elastomer. In addition, heat agent additives can be added, compression-set additives such as vinyl containing polysiloxanes, self-bonding additives to make the cured elastomer self-bonding to various substrates may also be added — one example of such being silyl isocyanurates and various other additives.

Finally, the silicone elastomer is cured by incorporating into it an alkyl peroxide at concentrations of anywhere from 0.01 to 10 parts and more preferably 0.01 to 5 parts by weight based on 100 parts of the base diorganopolysiloxane polymer. After the peroxides have been milled into the high molecular weight base polymer then the composition can be put into the desired form by simply heating it at temperatures above 100° and more preferably at temperatures above 150° C to cure the mixture into a silicone elastomer. Such compositions and the various additives that be added to them are illustrated in the foregoing references that were discussed previously in the background of the invention. There is only one caution to be observed in the additives that are added in that such additives must not conflict or dilute the effect of the fluorine substituted groups in the diorganopolysiloxane base polymer since such addition would degrade the solvent resistance of the final silicone elastomer for which purpose the fluorinated susbstituted diorganopolyssiloxane polymer is basically used in such heat vulcanizable silicone rubber compositions. It should be pointed out that at this point during the processing and Prior to cure of the base polymer that the process aid of the instant invention is added to the diorganopolysiloxane base polymer so as to allow the mixture to be mixed with the other ingredients and utilized to form the desired parts without unnecessary stickiness of the composition to the processing equipment and undesired shearing of the uncured composition upon being milled.

Before going into the types of process aids that are disclosed and claimed in the instant case, for utilization with fluoro-substituted polysiloxane base polymers, it is necessary to mention another type of composition that might be utilized with which the process aids of the instant case may be utilized. Such is the SiH olefin high viscosity platinum catalyzed compositions. One example of such compositions is in the foregoing Jeram case. However, while the Jeram case deals with such compositions in which the viscosity of the base polymer, vinyl containing base polymer is below 200,000 centipoise at 25° C, the present invention is the use of a process aid of the instant case on a high viscosity vinyl containing base polymer.

Accordingly, the base polymer of the instant case, that is the fluorinated substituted base polymer may comprise a vinyl terminated diorganopolysiloxane base polymer having a viscosity of anywhere of from 500,000 to 200,000,000 centipoise at 25° C with the organo groups are as previously defined for the heat vulcanizable silicone rubber compositions. Further, the foregoing amounts and types of reinforcing and extending fillers described previously may be utilized in the instant composition as noted in the Jeram case and the base polymer is cross-linked with a hydrosiloxane resin or polymer in the presence of a platinum catalyst which is present at a concentration of anywhere from 1 to 300 parts per million Based on the total weight of the composition. Such compositions are described in the foregoing Jeram case, with the exception of the high viscosity of vinyl terminated fluorinated substituted diorganopolysiloxane base polymer. As can be understood such high viscosity vinyl terminated fluorine substituted base polymer can be obtained by the procedure set forth in the foregoing Patents and Patent Applications described previously. In such compositions the hydrosiloxane resin or hydropolysiloxane polymer is kept separate from the vinyl containing fluorinated substituted base polymer and the platinum catalyst is packaged in the one constituent or the other. The filler and other ingredients are preferably packaged with the vinyl containing base polymer. When it is desired to catalyze the composition to form a silicone elastomer, the two parts are simply mixed and allowed to cure at room temperature to a silicone elastomer over an extended period of time or heated at elevated temperatures that is temperatures above 100° C for short period of time to produce the desired silicone elastomer. At any rate, the incorporation of fillers and other ingredients into such base vinyl containing polymers, fluorinated substituted base polymers is facilitated by the use of the process aids of the instant case which retard the stickitiveness of such compositions to processing equipment. In addition, if the hydrosiloxane resin or hydropolysiloxane polymer, has fluorine substituent units which preferably it does, the process aid of the instant case is also added to such materials to retard their stickitiveness to processing equipment. In addition, the use of a process aid within the instant invention in such composition is also desired when the two components are milled or molded in any way or manner to form the desired silicone elastomer. There will not be any further description of the base polymer that may be utilized in SiH olefin platinum catalyzed compositions or in heat vulcanizable silicone rubber compositions since such is well within the ambient of a worker skilled in the art.

Accordingly, a preferred process aid for use in the compositions of the instant case and specifically for heat vulcanizable silicone rubber compositions is a nonhalogenated process aid in which the diorganopolysiloxane polymer is preferably linear, having a viscosity varying from 100,000 to 10,000,000 centipoise at 25° C and more preferably having a viscosity varying from 200,000 to 5,000,000 centipoise at 25° C. Preferably such a polymer is a linear polymer although up to 10% of the diorganopolysiloxane polymer may comprise monofunctional and trifunctional siloxy units. As has been stated the substituent groups on such diorganopolysiloxane process aid do not contain any halogen groups and specifically fluorine groups, making the polymer easy to obtain and manufacture. Accordingly, the organo groups in such process aid polymer may be selected from monovalent hydrocarbon radicals that is any monovalent hydrocarbon radicals such as alkyl radicals of from 1 to 8 carbon atoms such as methyl, ethyl, propyl; alkenyl radicals such as vinyl, allyl; mononuclear aryl radicals such as phenyl radicals, methylphenyl, ethylphenyl; cycloalkyl radicals such as cyclohexyl, cycloheptyl, cyclooctyl, etc. More preferably, the organo groups of such diorganopolysiloxane process aids are selected from the class consisting of alkyl radicals, vinyl radicals, phenyl radicals and mixtures thereof wherein the vinyl concentration in such polymer varies from 5 to 25 weight percent generally and more preferably varies at a concentration of 8 to 16% by weight. It should be noted that such diorganopolysiloxane process aid must contain vinyl unsaturation to work in the invention of the instant case. Diorganopolysiloxane process aids which do not contain vinyl unsaturation have not been found to be effective as process aids with fluorinated subsituted polymers as described previously. It should be noted that if the vinyl concentration in the diorganopolysiloxane process aid polymer is less than 5% by weight then it has been found that it does not function as effectively as a process aid and if the vinyl concentration is more than 25% weight percent, it has been found that the increased amount of vinyl in the process aid does not noticeably increase the retardation of the stickitiveness of the base fluorinated substituted base polymer. Generally, such process aid is utilized at a concentration of anywhere from 2 to 25% by weight base on the base fluorinated substituted base polymer. More preferably it is utilized at a concentration of 2 to 10% by weight base on the base polymer. It should be noted that there is nothing critical about the above ranges since if less than 2% is utilized then there is not a marked decrease in the stickitiveness of the base fluorinated substituted polymer and if more than 25% by weight is utilized than the process aid dilutes the base polymer to the point that it may effect the solvent resistant properties of the silicone elastomer that is formed from the base polymer. Accordingly, the range 2 to 10% is more preferred for utilization of the process aid in the invention of the instant case. The preparation of such vinyl containing diorganopolysiloxane process aids is well known in the art.

Generally, such procedure comprises taking the preferably methyl or methylphenyl substituted cyclic tetrasiloxane equilibrating them with methylvinyl cyclic polysiloxanes in the presence of the desired amount of chain stopper such as hexamethyldisiloxane divinyltetramethyldisiloxane, octylmethyltrisiloxane and equilibrating these mixtures in the presence of a potassium hydroxide catalyst at a concentration of anywhere from 50 to 500 parts per million and heating the resulting equilibration mixture at elevated temperatures above 100° C and preferably at a temperature between 150° to 250° C to obtain at an equilibration point up to 85% conversion; that is when the equilibration point of 85% is reached as much of the tetramers is being converted to the linear polymer as there is a linear polymer being reconverted into the tetramers. The composition is then cooled to room temperature, the unreacted cyclics are then vented off and the catalyst is neutralized with a mild acid such as acetic acid. It is noted that the cyclic tetramers that are utilized in the above process depend of course on the appropriate concentration of methylphenyl that is desired in the final polymer and also the appropriate concentration of vinyl that is desired in the final polymer. In the instant process aid, it is desired that there be some methylphenyl, methylvinyl siloxy units in the polymer chain. Accordingly, enough of such tetramers is utilized that is the methylvinyl cyclic tetrasiloxanes to impart to the final desired polymer that is formed the desired vinyl concentration in the internal portion of the polymer chain. Utilizing this procedure, there is obtained a diorganopolysiloxane polymer process aid having a viscosity of anywhere from 100,000 to 10,000,000 centipoise at 25° C. Further, in the process for forming the process aid of the instant case there maybe utilized a certain amount of seeding material on which the basic polymer chain of the process aid is formed. Such seeding material generally comprises the trimethylsiloxane end-stopped dimethylpolysiloxane oil having a viscosity of anywhere from 5 to 1,000,000 centipoise at 25° C which is utilized in the equilibration mixture at a concentration anywhere from 1 to 10 parts based on 100 parts of the cyclotetrasiloxanes. Such dimethylpolysiloxane oils are well known in the art and their prepration is also well known. The incorporation of them in the preparation of the process aid of the instant case at the concentration set forth previously helps to build the basic linear polymer process aid of the instant case during the equilibration proceeding. However, such seeding dimethylpolysiloxane does not have to be utilized in the process set forth above. It is only utilized to facilitate the formation of a linear polymer in accordance with the instant disclosure. It should be noted that the present process aid of the instant case may have up to 10% by weight of combined monofunctional siloxy units and trifunctional siloxy units. It should also be noted that it is well within the ability of the worker skilled in the art to use the cyclicpolysiloxanes that are utilized in the process such that the substituent units of methyl, phenyl and vinyl be apportioned in such a manner so as to arrive at desired concentrations of these substituent units in the final process aid polymer that is produced.

It should also be noted that the appropriate methyl, vinyl cyclic polysiloxanes, dimethyl cyclicpolysiloxanes and methylphenyl cyclic polysiloxanes that are utilized to produce the preferred process aid of the instant case can be obtained by hydrolyzing the appropriate dichlorosilanes in water and then cracking the hydrolyzate by adding small concentrations of an alkali metal catalyst and preferentially distilling overhead the desired cyclictetrasiloxanes for utilization in the equilibration step that was discussed previously. Accordingly, more information will not be given as far as the foregoing process for producing the process aid of the instant case is concerned since such is well within the knowledge of the worker skilled in the art. The above includes a description of the use and also the preparation of the preferred process aid.

It should also be noted that such diorganopolysiloxane polymers that are utilized to prepare the process aid of the invention in the instant case, preferably have the formula $R''SiO_{(4-b)/2}$ where b varies from 1.9 to 2.1 and $R''$ is selected again from alkyl radicals having from 1 to 8 carbon atoms vinyl radicals, phenyl radicals, and mixtures thereof wherein the vinyl concentration in such formula varies from 5 to 25 weight percent. It should also be pointed out that generally the polymer have some trifunctionality in it or monofunctionality such that the diorganopolysiloxane process aid of the foregoing formula may have up to 10% in it combined monofunctional siloxy units and trifunctional siloxy units.

A less preferred process aid that may be utilized with the above fluorinated substituted base polymers as described previously is polysiloxane composed of $R_2SiO$ units and $R SiO_{3/2}$ units and having a viscosity in the range of 5 to 10,000 centipoise at 25° C and a silanol content varying from 0.1 to 5% by weight and where R is selected from the class consisting of monovalent hydrocarbon radicals, that is the polysiloxane does not contain any halogenated substituent units and more specifically fluorinated substituent groups. The R in the above formulas can be selected from any monovalent hydrocarbon radicals such as alkyl radicals of 1 to 8 carbon atoms such as methyl, ethyl, propyl; cycloalkyl such as cyclohexyl, cycloheptyl; alkenyl radicals such as vinyl, allyl and mononuclear aryl radicals such as phenyl, methylphenyl, ethylphenyl, etc. More preferably the R group in the above formula is selected from the class consisting of alkyl radicals having from 1 to 3 carbon atoms, phenyl radicals, vinyl radicals and mixtures thereof. Preferably such a process aid contains from 5 to 25% by weight vinyl. Such is not strictly necessary in all cases since it has been found that this second process aid will function to some extent in retarding the stickitiveness of the fluorinated substituted base polymer even if it contains no vinyl in it. However, for maximum effectiveness of the less preferred process aid it is desired that it contain anywhere from 5 to 25% by weight of vinyl units in it. Accordingly, and most preferably the R units in such formulas are preferably selected from methyl and vinyl with the foregoing concentration of vinyl as stated previously. In addition, it is preferred the concentration of the trifunctional units in the polymer vary from 4 to 15% by weight. In addition such process aid is utilized at the same concentration with the fluorinated substituted base polymer, that is a concentration of 2 to 25% by weight based on the fluorinated substituted base polymer or more preferably at a concentration of 2 to 10% by weight based on the fluorinated substituted base polymer. In addition, more preferably the trifunctional siloxy units in said process aid vary from 5 to 10% by weight as distinguished from the broader 4 to 15% by weight range given previously. It has been found that for some reason the trifunctionality in such a polymer of low molecular weight and viscosity retards the stickitiveness of fluorinated substituted polymers to some extent. Further, the second process aid preferably contains some vinyl unsaturation and preferably contains a certain amount of trifunctionality as disclosed above. Further, if the process aid does not have trifunctionality, or if the trifunctionality is below the range indicated previously in the polymer and is less than 4% by weight then the process aid is almost ineffective. If the concentration of the trifunctionality is above 15% by weight then no additional advantage is gained thereby. It should be noted that the foregoing process aid may be utilized in combination with the diorganopolysiloxane preferred process aid containing vinyl unsaturation but such is not necessary. It should be noted of course that the utilization of both process aids in the composition will markedly increase the retardation of stickitivenss in the fluoro-silicone substituted base polymer. However, as stated previously, large quantities of both process aids will unduly decrease the concentration of the fluorine substituted units in the base polymer which can deleteriously effect the solvent resistance of the final cured elastomer that is obtained from the fluorine substituted base polymer. Accordingly, with these cautions in mind the process aids can be utilized as desired for a particular composition. The second process aid containing from 4 to 15% by weight of trifunctionality in the polymer is simply obtained by hydrolyzing the appropriate methyl substituted dichlorosilanes, methyl substituted trichlorosilanes, methyl, vinyldichlorosilanes and vinyl or methyltrichlorosilanes in water. The hydrolysis is preferably carried out at room temperature. The resulting hydrolyzate is first separated from water then is purified by filtering it through Fuller's earth or any other well known filtering agent to obtain the second process aid of the instant invention having a viscosity of anywhere from 10,000 centipoise at 25° C and more preferably having the viscosity of anywhere from 5 to 1,000 centipoise at 25° C. The silanol content in such polymers varies as can be imagined but most preferably the silanol content is desired to be between 0.1 to 5% by weight. It should be noted that certain amounts of silanol is desired in the polymer to enhance its activity as a process aid with a fluorinated substituted base polymer of the instant case.

It is generally preferred that the trifunctional siloxy process aid contained from 0.1 to 5% by weight of silanol and preferably contains from 5 to 25% vinyl as mentioned previously. Either of the above process aids may be utilized together or alone to retard the stickitiveness of any fluorinated substituted base polymers. The first process aid such as the diorganopolysiloxane Polymer of at least 100,000 centipoise viscosity is the more preferred one to be utilized within the scope of the present invention. The examples below illustrate the reduction to practice of the instant case, but are not given for the purpose of limiting or defining the scope of the invention of the instant case. All parts in the examples are by weight.

EXAMPLE I

Obtained a process aid by equilibrating 100 parts octylmethylcyclotetrasiloxane, 5.3 parts trimethylsiloxy end-stopped dimethylpolysiloxane having a viscosity of 60,000 centipoise at 25° C 18.3 parts of tetramethyltetravinylcyclotetrasiloxane and 21 parts per million of decamethyltetrasiloxane in the presence of 50 parts per million of KOH at a temperature of 160° C. After equilibration was reached there was 85% of the cyclotetrasiloxane converted to the linear polysiloxane polymer. The reaction mixture was cooled to room temperature and the catalyst was neutralized with phosphoric acid. There results a dimethyl-methylvinylpolysiloxane polymer having a viscosity of 2,000,000 centipoise a vinyl content of 12%.

The following formulations were mixed on a two roll rubber mill:

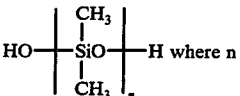

|  | Composition A (Parts by Wt.) | Composition B (Parts by Wt.) |
| --- | --- | --- |
| Trifluoropropyl-methyl siloxane polymer of 10,000,000 centipoise at 25° C | 100 | 100 |
| HO—[SiO(CH3)2]—H where n varies from 3 to 6 | 3 | 3 |
| Dimethyl-methylvinylpolysiloxane polymer as discussed previously | — | 4 |
| siloxane coated silica | 30 | 30 |
| benzoyl peroxide | 0.45 | 0.45 |

Composition A on the mill was observed to partition on the two rolls, and to adhere to the steel in a manner which was difficult to remove.
Composition B did not partition onto 2 rolls and could be cut from the roll with ease.

EXAMPLE 2

There was prepared process aid by hydrolyzing in water dimethyldichlorosilane and methyltrichlorosilane. From the resulting hydrolysis which was carried out at room temperature there was separated a silicone hydrolyzate from the water which hydrolyzate was then purified by passing it through Fuller's earth. There results then a polysiloxane polymer composed of dimethylsiloxy units and methyl siloxy units having a viscosity of 25 centipoise at 25° C, a trifunctional siloxy content of 7.6% by weight and a silanol content of 0.2% by weight. When 50 parts by weight of trifluoropropylmethyl polysiloxane was placed on a 2 roll rubber mill it partitioned onto both rolls. Addition of 0.3 parts by weight of the above described polysiloxane improved the polymer processability in a manner resulting in all of the polymer collecting on one roll from which it could be easily removed as a homogeneous sheet.

I claim:
1. A fluorosilicone composition that has superior resistance to sticking to processing equipment, comprising a base diorganopolysiloxane polymer having a viscosity in the range of 500,000 to 200,000,000 centipoise at 25° C wherein the organo groups are selected from the class consisting of alkyl radicals of 1 to 3 carbon atoms, vinyl radicals, phenyl radicals and 3,3,3 trifluoropropyl radicals and mixtures thereof wherein the concentrations of the trifluoropropyl radical varies from 5 to 50 mole percent and consisting of non-halogenated process aids, one of which must be a diorganopolysiloxane having a viscosity varying from 100,000 to 10,000,000 centipoise at 25° C wherein the organo groups are selected from alkyl radicals, vinyl radicals, phenyl radicals and mixtures thereof and wherein the vinyl unsaturation varies from 5 to 25 weight percent.

2. The composition of claim 1 wherein said process aid is present at a concentration of 2 to 25% by weight based on the base polymer.

3. The composition of claim 1 wherein in said process aid the vinyl concentration is present only on silicone atoms in the internal portion of the polymer chain.

4. The composition of claim 3 wherein the vinyl concentration in said process aid varies from 8 to 16% by weight.

5. The composition of claim 1 wherein therein is additionally present a peroxide curing catalyst.

6. The composition of claim 1 wherein in said base polymer has a vinyl concentration of 0.01 to 4 mole percent.

7. The composition of claim 6 wherein there is additionally present a hydride polysiloxane and an effective amount of a platinum catalyst and filler selected from the class consisting of reinforcing and extending fillers.

8. The composition of claim 5 wherein there is additionally present a filler selected from the class consisting of reinforcing and extending fillers.

9. A process for improving the processability of fluorosilicone polymers comprising adding to such fluorosilicone polymers from 2 to 25% by weight of a non-halogenated process aid which is a diorganopolysiloxane polymer having a viscosity varying from 100,000 to 10,000,000 centipoise at 25° C wherein the organo groups are selected from alkyl radicals, vinyl radicals, phenyl radicals and mixtures thereof and wherein the vinyl concentration in said polymer varies from 2 to 25% by weight.

10. The process of claim 9 wherein said fluorosilicone polymer comprises a base diorganopolysiloxane polymer having a viscosity in the range of 500,000 to 200,000,000 centipoise at 25° C wherein the organo groups are selected from the class consisting of alkyl radicals of 1 to 3 carbon atoms, vinyl radicals, phenyl radicals and 3,3,3 trifluoropropyl radicals and mixtures thereof wherein the concentration of said trifluoropropyl radicals vary from 5 to 50 mole percent.

11. The process of claim 10 wherein in said process aid the vinyl concentration is present only on the silicone atoms in the internal portion of the polymer chain.

12. The process of claim 1 wherein the vinyl concentration in said process aid varies from 8 to 16% by weight.

13. The process of claim 10 wherein there is additionally present a peroxide curing catalyst.

14. The process of claim 10 wherein said base polymer has a vinyl concentration of 0.01 to 4 mole percent.

15. The process of claim 14 wherein there is additionally present a hydride polysiloxane, an effective amount of a platinum catalyst and a filler selected from reinforcing and extending fillers.

16. The process of claim 13 wherein there is additionally present a filler selected from the class consisting of reinforcing and extending fillers.

17. A fluorosilicone composition that has superior resistance to sticking to processing equipment comprising a base diorganopolysiloxane polymer having a viscosity in the range of 500,000 to 200,000,000 centipoise at 25° C wherein the organo groups are selected from the class consisting of alkyl radicals of 1 to 3 carbon atoms, vinyl radicals, phenyl radicals and 3,3,3 trifluoropropyl radicals and the concentration of said fluoropropyl radicals varies from 5 to 50 mole percent and consisting of non-halogenated process aids, one of which must be a polysiloxane composed of $R_2SiO$ and $RSiO_{3/2}$ units and having a viscosity in the range of 5 to 10,000 centipoise at 25° C, and a silanol content varying from 0.1 to 5% by weight and where R is selected from the class consisting of alkyl radicals of 1 to 3 carbon atoms, phenyl and vinyl and mixtures thereof.

18. The composition of claim 17 wherein the concentration of $RSiO_{3/2}$ units in said process aid varies from 4 to 15% by weight.

19. The composition of claim 18 wherein R is methyl.

20. The composition of claim 17 wherein said process aid is present at a concentration of 2 to 25% by weight based on the base polymer.

21. The composition of claim 18 wherein the concentration of $RSiO_{3/2}$ units in said process aid varies from 5 to 10% by weight.

22. The composition of claim 17 wherein therein is additionally present a peroxide curing catalyst.

23. The composition of claim 17 wherein said base polymer has a vinyl concentration of 0.01 to 4 mole percent.

24. The composition of claim 23 wherein there is additionally present a hydride polysiloxane and an effective amount of a platinum catalyst and a filler selected from the class consisting of reinforcing and extending fillers.

25. The composition of claim 22 wherein there is additionally present a filler selected from the class consisting of reinforcing and extending fillers.

26. A process for improving the processability of fluorosilicone polymers comprising adding to said fluorosilicone polymer from 2 to 25% by weight of non-halogenated process aids, one of which must be a polysiloxane composed of $R_2SiO$ units and $RSiO_{3/2}$ units and having a viscosity in the range of 5 to 10,000 centipoise at 25° C and a silanol content varying from 0.1 to 5% by weight and where R is selected from the class consisting of alkyl radicals of 1 to 3 carbon atoms, phenyl and vinyl and mixtures thereof.

27. The process of claim 26 wherein the concentration of $RSiO_{3/2}$ units in said process aid varies from 4 to 15% by weight.

28. The process of claim 27 wherein R is methyl.

29. The process of claim 26 wherein said fluorosilicone polymer comprises a base diorganopolysiloxane polymer having a viscosity in the range of 500,000 to 200,000,000 centipoise at 25° C wherein the organo groups are selected from the class consisting of alkyl radicals of 1 to 3 carbon atoms, vinyl radicals, phenyl radicals and 3,3,3 trifluoropropyl radicals and the concentration of the trifluoropropyl radicals vary from 5 to 50 mole percent.

30. The process of claim 26 wherein said process aid is present at a concentration of 2 to 10% by weight based on the base polymer.

31. The process of claim 27 wherein the concentration of $RSiO_{3/2}$ units in said process aid varies from 5 to 10% by weight.

32. The process of claim 26 wherein there is additionally present a peroxide curing catalyst.

33. The process of claim 29 wherein said base polymer has a vinyl concentration of 0.01 to 4 mole percent.

34. The process of claim 33 wherein there is additionally present a hydride polysiloxane and an effective amount of a platinum catalyst and a filler selected from the class consisting of reinforcing and extending fillers.

35. The process of claim 32 wherein there is additionally present a filler selected from the class consisting of reinforcing and extending fillers.

* * * * *